(12) United States Patent
Hwang

(10) Patent No.: US 9,315,068 B2
(45) Date of Patent: Apr. 19, 2016

(54) ELECTRONIC HANDWRITING PROCESSING DEVICE AND METHOD THEREOF

(71) Applicant: Jih-Shang Hwang, Taoyuan (TW)

(72) Inventor: Jih-Shang Hwang, Taoyuan (TW)

( * ) Notice: Subject to any disclaimer, the term of this patent is extended or adjusted under 35 U.S.C. 154(b) by 107 days.

(21) Appl. No.: 14/096,924

(22) Filed: Dec. 4, 2013

(65) Prior Publication Data

US 2015/0151558 A1  Jun. 4, 2015

(51) Int. Cl.
*B43K 29/00* (2006.01)
*A47L 13/32* (2006.01)
*B43L 19/00* (2006.01)
*C09D 11/50* (2014.01)

(52) U.S. Cl.
CPC ............ *B43L 19/0043* (2013.01); *C09D 11/50* (2013.01); *B41M 2205/18* (2013.01)

(58) Field of Classification Search
CPC .... C09D 11/50; G02F 1/0147; B43L 19/0043
USPC .................. 401/1, 2, 195; 345/179
See application file for complete search history.

(56) References Cited

U.S. PATENT DOCUMENTS

| 4,176,273 A | * | 11/1979 | Fujie et al. ..................... 219/220 |
| 7,180,509 B2 | * | 2/2007 | Fermgard et al. ............. 345/179 |
| 7,661,896 B2 | * | 2/2010 | Zawitz ............................. 401/6 |

* cited by examiner

*Primary Examiner* — Jennifer C Chiang

(57) ABSTRACT

An electronic handwriting processing method, used to process handwriting written on a writing medium with temperature-dependent color ink, including following steps: provide a temperature varying element; apply said temperature varying element, so that it reaches temperature to make said temperature-dependent color ink to change from a first color to a second color; and contact said handwriting with said temperature varying element, to change its color from said first color to said second color, wherein, one of said first color and said second color is visible, while the other is transparent. An electronic handwriting processing device is also disclosed.

9 Claims, 5 Drawing Sheets

ELECTRONIC HANDWRITING PROCESSING DEVICE AND METHOD THEREOF

BACKGROUND OF THE INVENTION

1. Field of the Invention

The present invention relates to an electronic handwriting processing device and method thereof, and in particular to a processing device and method for erasing/recovering handwriting formed by temperature-dependent color ink.

2. The Prior Arts

Presently, the electronic rubber eraser is realized through using rotation and vibration of motor, to bring the rubber eraser into actions of erasing, yet it can only be used to erase handwriting of pencil. In this respect, Pilot Company developed a handwriting erasable ball pen utilizing a special ink, that is quite popular among users and is widely used. This type of special pen is attached with a rubber eraser. In operation, heat is generated through friction of the rubber eraser and the surface of paper, so that when heat thus generated exceeds a certain temperature, the color of the ink will change. However, the action and movement of the eraser will adversely affect the surface appearance of the paper, leaving wrinkles. Moreover, in case the quality of the paper is not good enough, then the ink will get into fiber of the paper, to result in un-ideal erasing effect. In addition, after being erased with rubber eraser, the ink is difficult to recover.

Therefore, presently the design and utilization of handwriting rubber eraser is not quite satisfactory, and it has much room for improvement.

SUMMARY OF THE INVENTION

In view of the problems and drawbacks of the prior art, the present invention provides an electronic handwriting processing device and method thereof, to effectively overcome the shortcomings of the prior art.

A major objective of the present invention is to provide an electronic handwriting processing device and method thereof. In the present invention, a temperature-dependent color ink is utilized, so that when its temperature exceeds a certain level (for example, over 70° C.), the ink becomes transparent. In contrast, when its temperature drops below a certain level (for example, below −10° C.), the ink will restore its original color. The electronic handwriting processing method utilizes a temperature varying element to replace the conventional method of generating heat through friction, such that the temperature varying element is made to contact the handwriting to change its color. In this way, not only the handwriting can be heated to become transparent, but the transparent handwriting can also be cooled by a cooling element to restore its original color.

In addition, the present invention provides an electronic handwriting processing device, including: a temperature varying element, a power supply, a power control device; a contact element; a function display element; and an illumination device. Wherein, the temperature varying element can be a resistor heater or a Peltier cooler, or both can be provided, such that the temperature varying element can be pushed or pressed to achieve switching to heating or cooling. A temperature sensing element can be optionally provided to the temperature varying element. The power control device includes a control circuit, that supplies power to the temperature varying element based on the condition of the temperature sensing element. The illumination device is used to emit ultraviolet light to show the handwriting to be recovered. As such, through utilizing electronic handwriting processing device and method thereof, it can not only replace the conventional friction type handwriting eraser, but it can also add the function of handwriting recovery.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
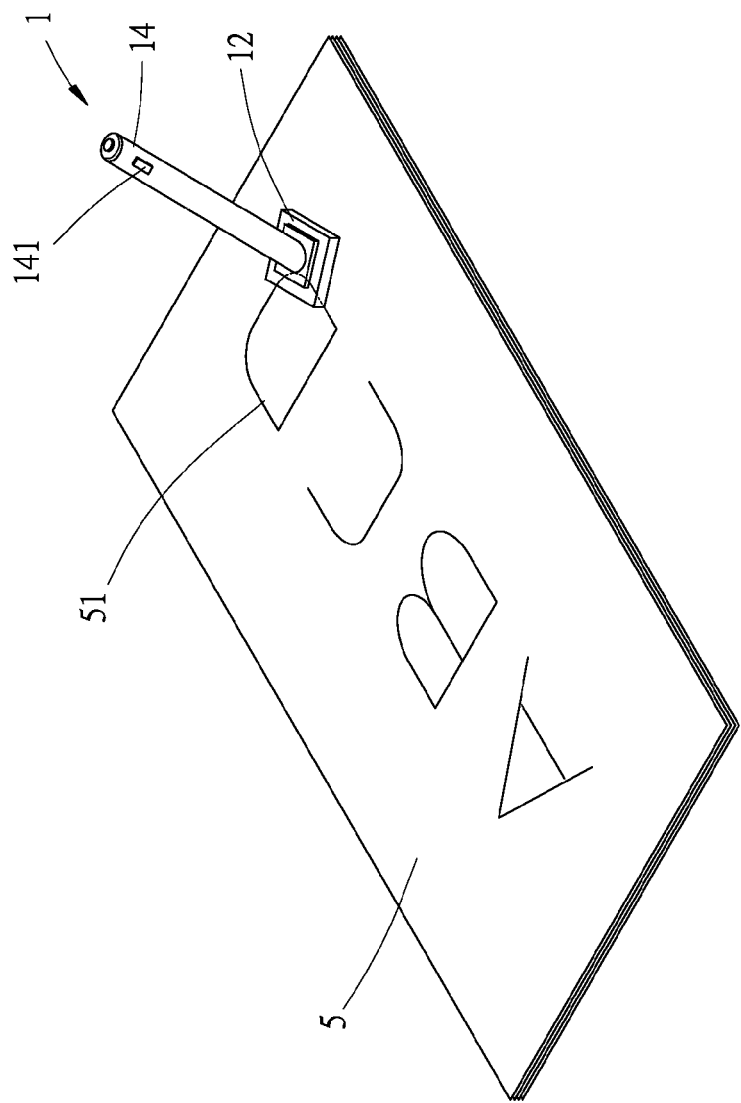
FIG. 1 is a schematic diagram of operating an electronic handwriting processing method to erase or recover handwriting according to the present invention.

The present invention provides an electronic handwriting processing method. Refer to FIG. 1 for a schematic diagram of operating an electronic handwriting processing method to erase or recover handwriting according to the present invention. As shown in FIG. 1, it is used to handle the handwriting 51 formed on a writing medium 5 utilizing a temperature-dependent color ink, comprising the following steps. Firstly, providing a temperature varying element 12, that is installed on an electronic handwriting processing device 1. The temperature varying element 12 may change its temperature through operation of user (for example, by means of a switch 141), so that the temperature-dependent color ink on the handwriting 51 may change from visible color to transparent, or it may change from transparent to visible color. In this approach, through making the temperature varying element 12 to contact the writing medium 5, the objective of erasing/restoring handwriting is successfully achieved.

Figure 2:
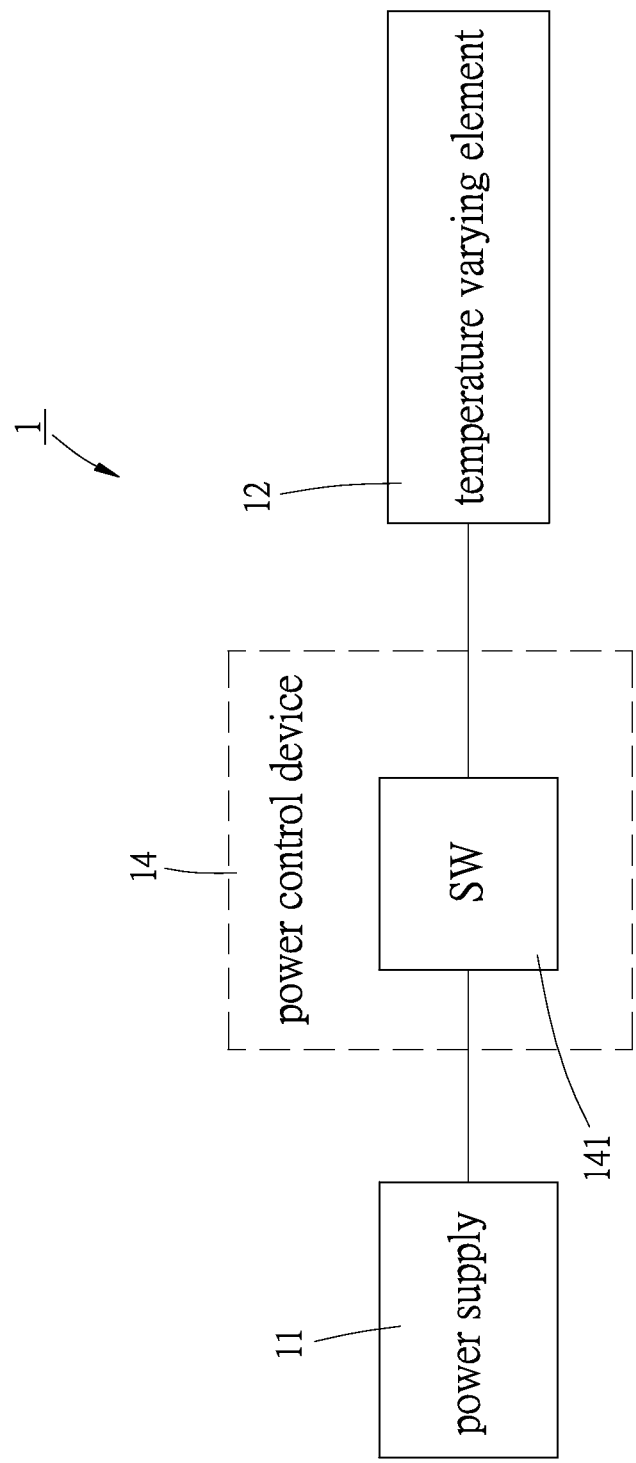
FIG. 2 is a block diagram of an electronic handwriting processing device according to an embodiment of the present invention.

Then, refer to FIG. 2 for a block diagram of an electronic handwriting processing device according to an embodiment of the present invention. As shown in FIG. 2, the electronic handwriting processing device 1 includes: a power supply 11, a temperature varying device 12, and a power control device 14. The power supply 11 is a battery or other power supplies. The power control device 14 is provided with a switch 141, to control the power supplied to the temperature varying element 12. The temperature varying element 12 is connected to the power supply 11, and it uses the power supplied by the power supply 11 to change its temperature. Also, as shown in FIG. 1, the temperature varying element 12 is used to contact a handwriting 51, to change color of the handwriting to another color. In case the temperature varying element 12 is a heating element, such as a resistor type heating element, thus it can be heated through the power provided by the power supply 11, so that the surface temperature of the temperature varying element 12 can make the handwriting to turn from visible color to transparent, to eliminate the color of handwriting, in achieving electronic erasing.

The temperature-dependent color ink provided by the supplier such as Pilot Company will turn to transparent when its temperature is higher than a certain temperature (for example 70° C.), and it will restore to its original color when its temperature is lower than a certain temperature (for example −10° C.). Through using this characteristic, the temperature varying element 12 can be a cooling element, to turn handwriting of the ink from transparent into the original color through the cooling effect of the temperature varying element 12. The cooling element can be a Peltier cooler, that includes a heat dissipation plate or a fan. Presently, the size of the Peltier cooler can be reduced to a few square mm (mm$^2$), such that when 0.7 A current is supplied, it can create a temperature difference of more than 40° C., in achieving function of restoring original color of handwriting.

Figure 3:
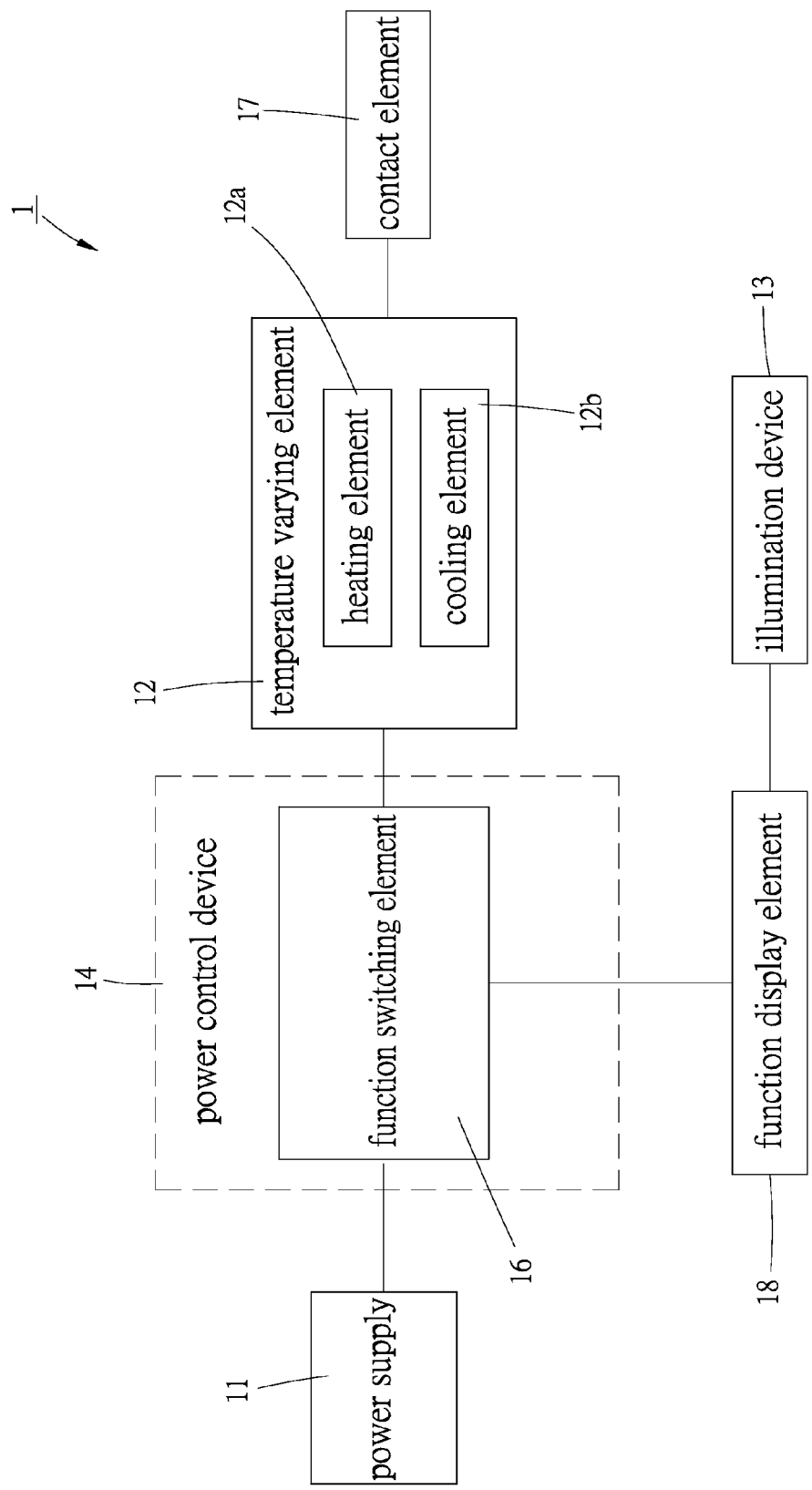
FIG. 3 is a block diagram of an electronic handwriting processing device according to another embodiment of the present invention.

In the above-mentioned description, since the handwriting will become transparent after being heated, such that it is difficult to find its location. Therefore, as shown in FIG. 3, an optional illumination device 13 is provided to the electronic handwriting processing device 1, to supply the light source, so that the transparent handwriting may show visible color after being exposed to the light, to show the location of the handwriting. Usually, light-emitting-diode (LED) emitting ultraviolet light of wavelength less than 380 nm is used to show the trace of the ink, and is helpful to restore the handwriting.

The temperature varying element 12 can be a heating element or a cooling element. However, for convenience of operation, as shown in FIG. 3, a temperature varying element 12 may include both a heating element 12*a* and a cooling element 12*b*. A function switching element 16 is disposed between the temperature varying element 12 and a power supply 11, to switch between functions of heating and cooling. The function switching element 16 can be a three-state switch (open/forward connection/reverse connection), or a capacitive or optical contact sensing element, to control the temperature varying element 12 to switch among functions of shut-down, heating, and cooling.

Figure 4:
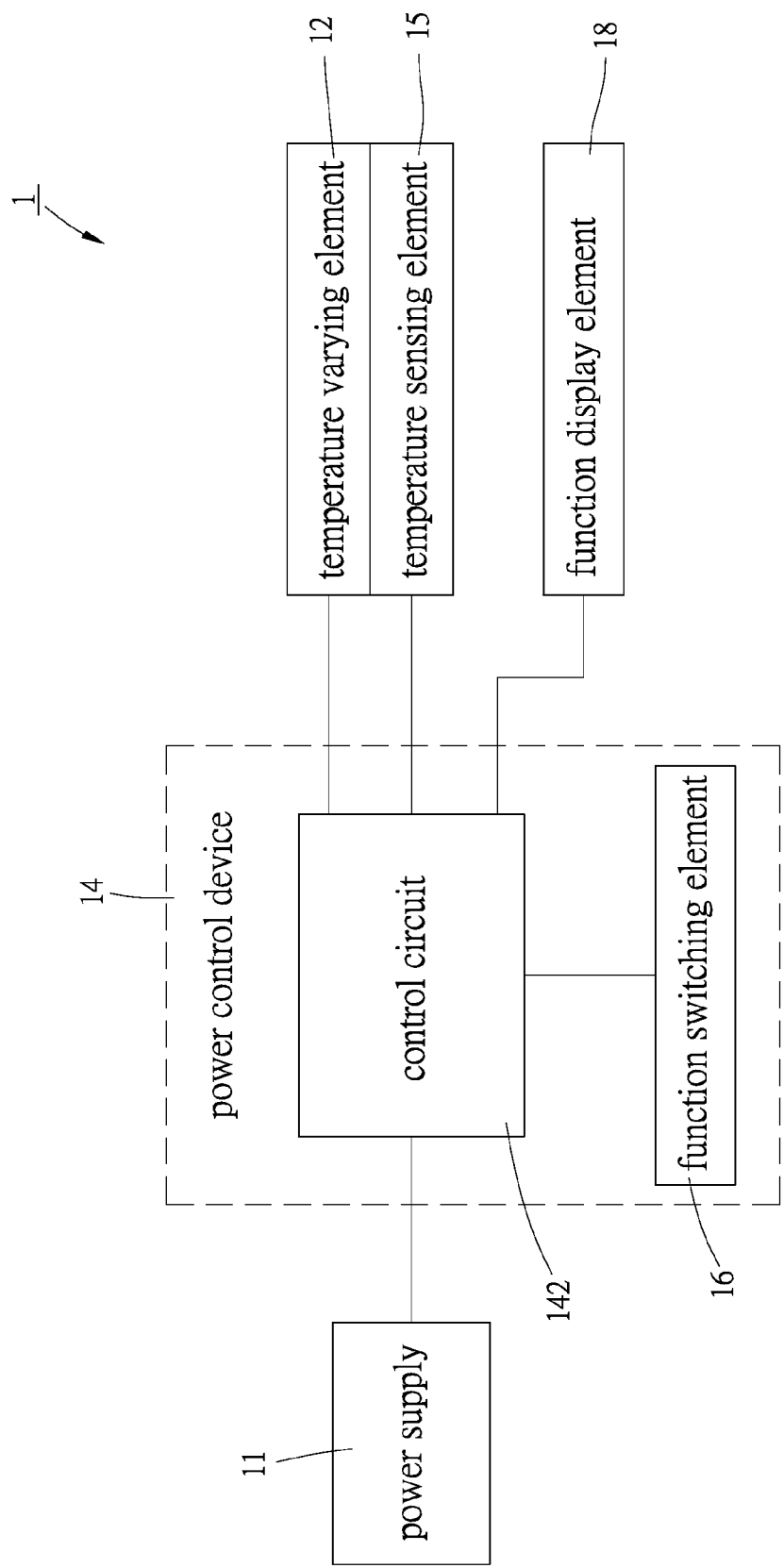
FIG. 4 is a block diagram of an electronic handwriting processing device according to a further embodiment of the present invention.
Figure 5:
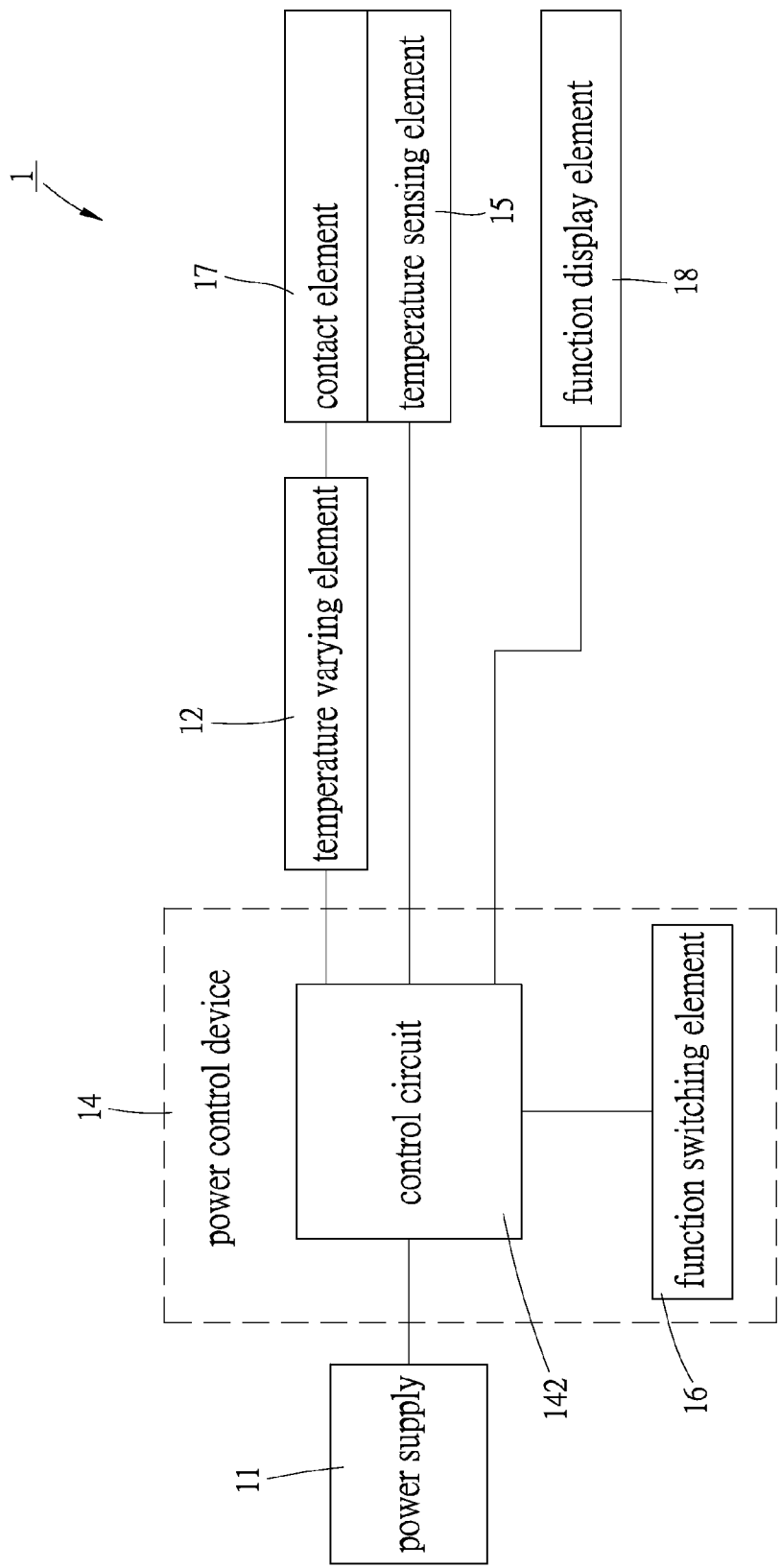
FIG. 5 is a block diagram of an electronic handwriting processing device according to yet another embodiment of the present invention.

Then, refer to FIGS. 4 and 5 respectively, for a block diagram of an electronic handwriting processing device according to a further embodiment of the present invention; and a block diagram of an electronic handwriting processing device according to yet another embodiment of the present invention. As shown in FIGS. 4 and 5, in order to control the temperature of the temperature varying element 12 more accurately, the electronic handwriting processing device 1 can be optionally provided with a temperature sensing element 15, located on the temperature varying element 12, to sense its temperature. To match the disposition of the temperature sensing element 15, the power control device 14 can be provided with a control circuit 142, connected to the temperature sensing element 15 and the power supply 11. In addition, the function switching element 16 connected to the control circuit can be the switch 141 mentioned above, or a capacitive or optical contact sensing element. In this arrangement, the control circuit 142 is able to control the power supplied from the power supply 11 to the temperature varying element 12 based on the conditions of the function switching element 16 and the temperature sensing element 15, in controlling the temperature varying element 12. In order to show the switched function state, a function display element 18 is connected to the control circuit 142. In case the control circuit 142 is not provided as shown in FIG. 3, the function display element 18 can be connected onto the function switching element 16. The function display element 18 can be formed by a plurality of LEDs or other elements to indicate shut-down, heating, and cooling conditions.

Finally, refer to FIGS. 3 and 5. As shown in FIGS. 3 and 5, a contact element 17 can be provided on the temperature varying element 12, to provide a better contact interface between the temperature varying element 12 and the writing medium 5 of handwriting 51 as shown in FIG. 1. The contact element 17 is made of material of good heat conduction, that is both heat resistant/cold resistant, to facilitate heat exchange between the temperature varying element 12 and the surface of the writing medium 5. The temperature sensing element 15 can be placed directly on the temperature varying element 12; moreover, it can also be placed on the contact element 17 as shown in FIG. 5.

Summing up the above, the present invention provides a temperature varying element to contact the handwriting written with temperature-dependent color ink, to erase or recover handwriting. In this approach, the conventional friction type eraser can be replaced, and the handwriting can be recovered, such that its function, effectiveness, and operation efficiency are raised.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An electronic handwriting processing method, used to process handwriting written on a writing medium with temperature-dependent color ink, including following steps:

provide a temperature varying element;

said temperature varying element including both a heating element and a cooling element; and a power control device, connected electrically between said power supply and said temperature varying element, wherein said power control device includes a switch and a function switching element provided by said switch or by a contact sensing element;

apply said temperature varying element, so that it reaches temperature to make said temperature-dependent color ink to change from a first color to a second color; and contact said handwriting with said temperature varying element, to change color of said handwriting from said first color to said second color, wherein, one of said first color and said second color is visible, while the other is transparent.

2. The electronic handwriting processing method as claimed in claim 1, comprising further following steps:

apply said temperature varying element, so that it reaches temperature to make said temperature-dependent color ink to change from said second color to said first color; and contact said handwriting with said temperature varying element, to change its color from said second color to said first color.

3. An electronic handwriting processing device, said electronic handwriting processing device comprising:
   a power supply;
   a temperature varying element, connected electrically to said power supply, to use power provided by said power supply to change a temperature of said temperature varying element, said temperature varying element including both a heating element and a cooling element; and
   a power control device, connected electrically between said power supply and said temperature varying element, wherein said power control device includes a switch and a function switching element provided by said switch or by a contact sensing element.

4. The electronic handwriting processing device as claimed in claim 3, wherein said cooling element is a Peltier cooler.

5. The electronic handwriting processing device as claimed in claim 3, further comprising: an illumination device, connected electrically to said power supply, to supply light to make said transparent handwriting visible, to show a location of said handwriting.

6. The electronic handwriting processing device as claimed in claim 3, further comprising: a temperature sensing element, to sense temperature of said temperature varying element; while said power control device further includes a control circuit, connected electrically to said temperature sensing element and said power supply, to control power supplied from said power supply to said temperature varying element, based on conditions of said function switching element and said temperature varying element.

7. The electronic handwriting processing device as claimed in claim 6, further comprising: a function display element, connected electrically to said function switching element, to show conditions of said switched function.

8. The electronic handwriting processing device as claimed in claim 7, wherein said function display element is formed by a plurality of light-emitting-diodes (LED).

9. The electronic handwriting processing device as claimed in claim 3, further comprising the contact element, disposed on said temperature varying element, to contact said writing medium, to enable heat exchange between said temperature varying element and said writing medium.

* * * * *